(12) United States Patent
Mason et al.

(10) Patent No.: US 7,694,943 B2
(45) Date of Patent: Apr. 13, 2010

(54) CARBURETOR

(75) Inventors: John Mason, Tralee (IE); Roger Bowles, Tralee (IE); Patrick O'Shea, Tralee (IE)

(73) Assignee: Barcarole Limited, Cork (IE)

( * ) Notice: Subject to any disclaimer, the term of this patent is extended or adjusted under 35 U.S.C. 154(b) by 374 days.

(21) Appl. No.: 11/800,509

(22) Filed: May 4, 2007

(65) Prior Publication Data
US 2007/0257379 A1 Nov. 8, 2007

(30) Foreign Application Priority Data
May 5, 2006 (IE) .............................. S2006/0353

(51) Int. Cl.
*F02M 7/12* (2006.01)
(52) U.S. Cl. ................. 261/23.3; 123/73 PP; 261/54; 261/DIG. 1
(58) Field of Classification Search ............. 261/23.2, 261/23.3, 45, 54, 63, DIG. 1; 123/73 PP
See application file for complete search history.

(56) References Cited

U.S. PATENT DOCUMENTS

| 4,333,429 | A | * | 6/1982 | Iiyama et al. ............... 123/274 |
| 6,101,991 | A | * | 8/2000 | Glover .................... 123/73 PP |
| 6,120,007 | A | * | 9/2000 | Grant ...................... 261/23.2 |
| 6,334,606 | B1 | * | 1/2002 | Tobinai et al. .............. 261/23.3 |
| 6,435,482 | B1 | * | 8/2002 | Omi et al. .................... 261/70 |
| 7,011,298 | B2 | * | 3/2006 | Gerhardy et al. ............. 261/46 |
| 7,013,851 | B2 | * | 3/2006 | Prager .................... 123/73 PP |
| 7,090,204 | B2 | * | 8/2006 | Zwimpfer et al. ............. 261/46 |
| 7,258,327 | B2 | * | 8/2007 | Prager ....................... 261/46 |
| 7,261,281 | B2 | * | 8/2007 | Raffenberg ................ 261/44.8 |
| 7,407,153 | B2 | * | 8/2008 | Glover ....................... 261/46 |
| 2005/0073062 | A1 | * | 4/2005 | Zwimpfer et al. ............. 261/65 |
| 2005/0188952 | A1 | * | 9/2005 | Prager ...................... 123/337 |
| 2006/0131763 | A1 | * | 6/2006 | Raffenberg .................. 261/43 |
| 2006/0163755 | A1 | * | 7/2006 | Prager ....................... 261/46 |
| 2007/0132115 | A1 | * | 6/2007 | Glover ....................... 261/40 |
| 2009/0013963 | A1 | * | 1/2009 | Eberhardt et al. ........... 123/337 |

FOREIGN PATENT DOCUMENTS

JP 61-169649 A * 7/1986 ................ 261/23.2

* cited by examiner

*Primary Examiner*—Richard L Chiesa
(74) *Attorney, Agent, or Firm*—Harness, Dickey & Pierce, P.L.C.

(57) ABSTRACT

A carburetor for feeding separate lean and rich channels of an engine intake duct includes a body having a mixing passage with an air intake side and an engine outlet side. A throttle shutter is rotatable about an axis transverse the mixing passage, and a partition is located within the mixing passage upstream of the throttle shutter. The downstream edge of the partition is adjacent the throttle shutter axis whereby in use of the carburetor the partition defines an extension of the lean and rich channels upstream of the throttle shutter, the partition thus providing substantial isolation between the lean and rich channels for all rotational positions of the throttle shutter. In a preferred embodiment a choke shutter is located upstream of the throttle shutter and is rotatable about a further axis transverse the mixing passage, the upstream edge of the partition being adjacent to the axis of the choke shutter.

9 Claims, 5 Drawing Sheets

IDLE OPERATION

INTERMEDIATE OPERATION

FULL LOAD OPERATION

CARBURETOR

FIELD

This invention relates to a carburetor.

BACKGROUND AND SUMMARY

U.S. Pat. No. 6,101,991 describes in FIGS. 4 to 6 thereof a carburetor for a two-stroke engine in which the outlet side of the fuel-air mixing passage is connected to separate relatively lean and rich fuel channels of an engine intake duct. However, except when the throttle shutter is fully open, FIG. 6, the channel separation does not extend upstream into the carburetor itself. It is difficult to calibrate a carburetor that feeds two such channels if they are allowed to communicate with each other in the carburetor during idle and intermediate throttle shutter positions of the carburetor.

Accordingly, the present invention provides a carburetor for feeding separate lean and rich channels of an engine intake duct, the carburetor comprising a body having a mixing passage with an air intake side and an engine outlet side, a throttle shutter rotatable about an axis transverse the mixing passage, and a partition located within the mixing passage upstream of the throttle shutter, the downstream edge of the partition being adjacent the throttle shutter axis whereby in use of the carburetor the partition defines an extension of the lean and rich channels upstream of the throttle shutter, the partition providing substantial isolation between the lean and rich channels for all rotational positions of the throttle shutter.

Preferably the carburetor further includes a choke shutter located upstream of the throttle shutter and rotatable about a further axis transverse the mixing passage, the upstream edge of the partition being adjacent to the axis of the choke shutter.

The invention provides a more effective separation of the lean and rich fuel channels for all throttle shutter positions and therefore reduces the number of variables when calibrating the carburetor.

BRIEF DESCRIPTION OF THE DRAWINGS

Embodiment of the invention will now be described, by way of example, with reference to the accompanying drawings, in which.

DETAILED DESCRIPTION

Figure 1:
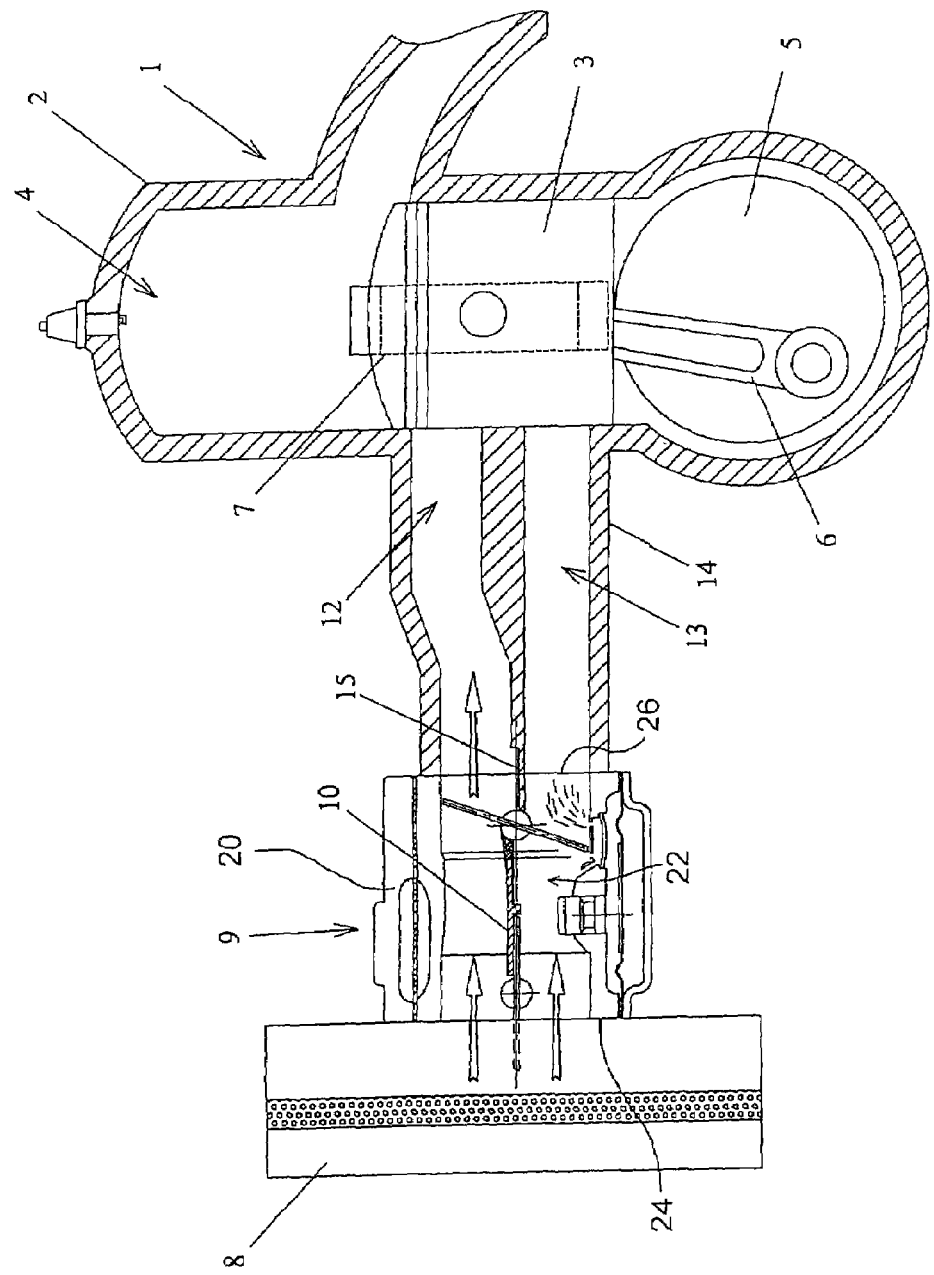
FIG. 1 is a schematic cross-sectional view of a first embodiment of carburetor according to the invention attached to a two-stroke engine with closed port forward scavenging air positioning.

FIG. 1 illustrates a diaphragm type carburetor attached to a two-stroke engine which may be, but is not necessarily, a small engine of the type used on hand-held products such as chain saws, trimmers, garden blowers, concrete saws, etc.

The two-stroke engine 1 has a cylinder 2 containing a reciprocating piston 3 defining a combustion chamber 4, the piston being connected to a crankshaft 5 via a connecting rod 6. The crankcase is connected to the combustion chamber 4 via transfer ports 7.

Figure 2:
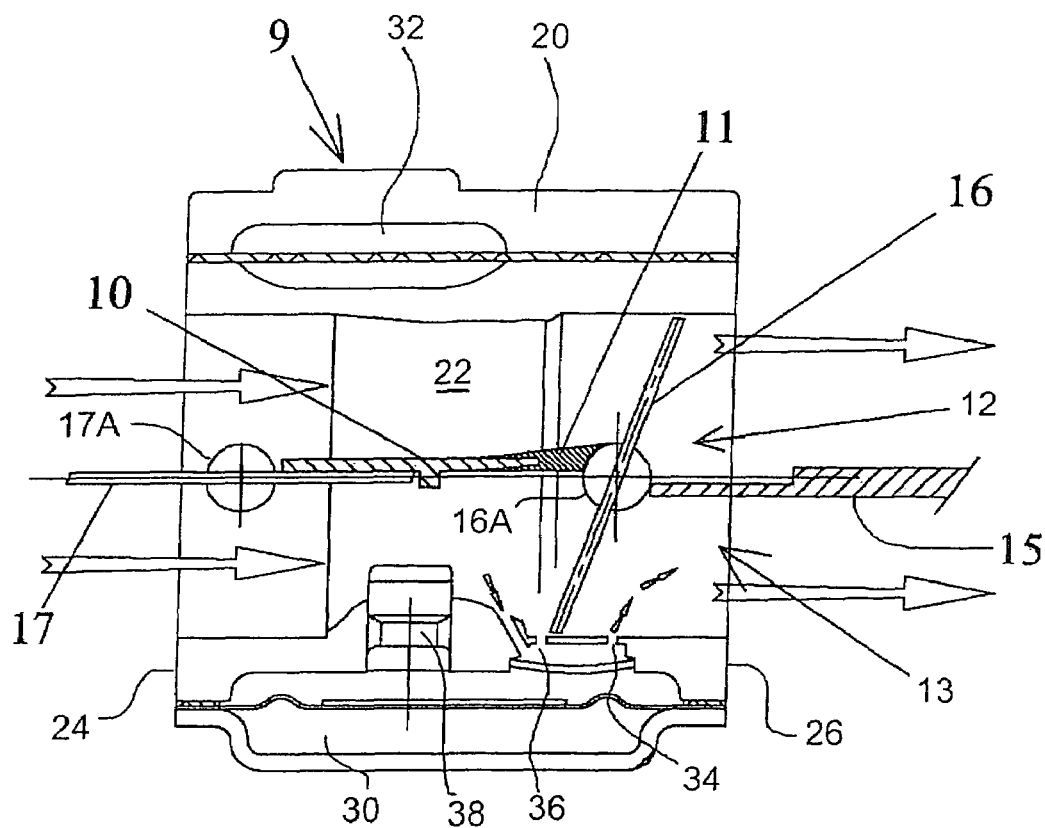
FIG. 2 is a schematic cross-sectional view of the carburetor in idle operation.

Referring also to FIG. 2, a carburetor 9 comprises a carburetor body 20 defining a mixing passage 22 having an air intake side 24 and an engine outlet side 26. A throttle shutter 16 and a choke shutter 17 are mounted within the mixing passage 22 between the air intake side and the engine outlet side, the choke shutter being upstream of the throttle shutter. Each shutter 16, 17 comprises a cylindrical axle 16A, 17A respectively and is rotatable, on its axle 16A or 17A, about a respective axis transverse the mixing passage 22. A diaphragm-operated metering chamber 30 supplies fuel from a fuel pump 32 into the carburetor mixing passage via a primary (idle) jet 34, an intermediate jet 36 and a full load jet 38.

An air filter 8 is attached to the air intake side 24 of the carburetor 9. The engine outlet side 26 of the carburetor 9 is connected to the engine 1 by an intake duct 14 that has a dividing wall 15 defining two separate channels, a lean (or air) channel 12 and a rich (or air-fuel) channel 13.

The construction and operation of such carburetors, as well as two-stroke engines, is very well known to those skilled in the art and, therefore, the following description will concentrate on the differences from the conventional carburetor.

Figure 3:
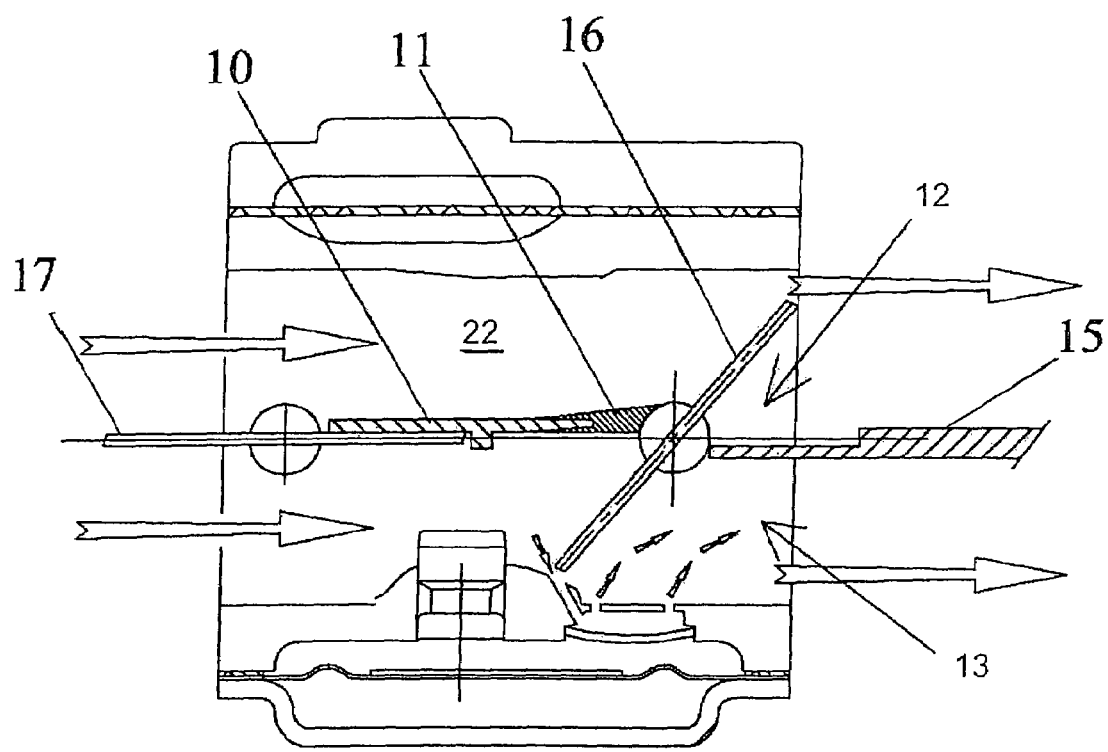
FIG. 3 is a schematic cross-sectional view of the carburetor in intermediate load operation.
Figure 4:
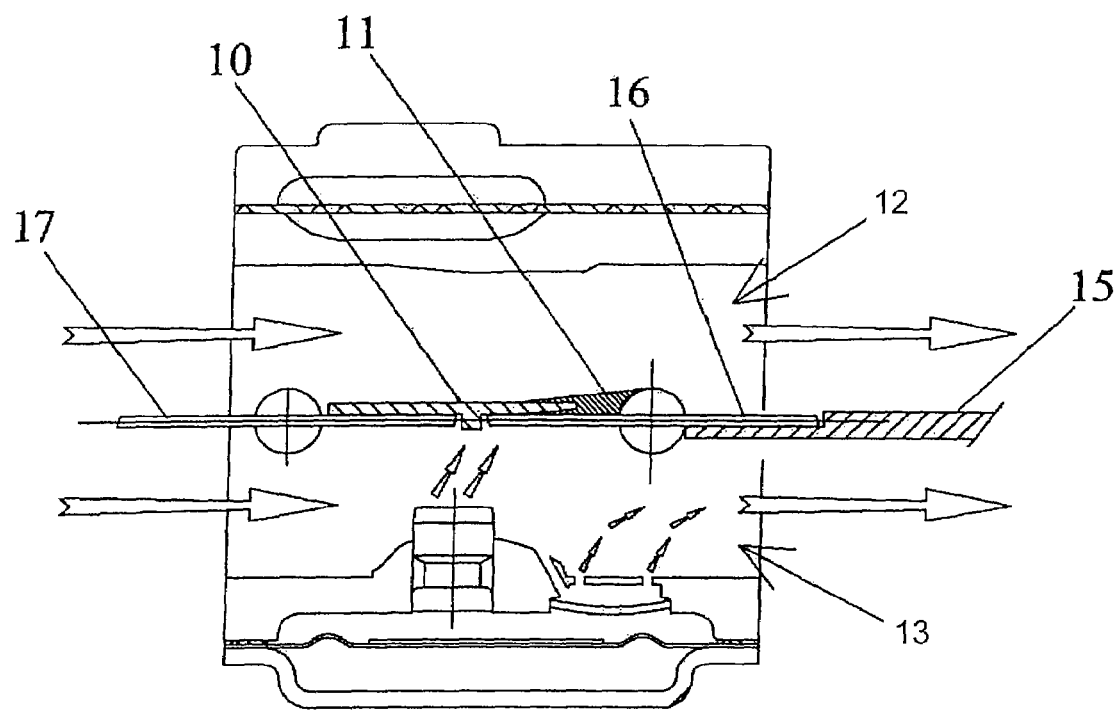
FIG. 4 is a schematic cross-sectional view of the carburetor in full load operation.

The dividing wall 15, which in FIG. 1 forms part of the intake duct 14, is located downstream of the throttle shutter and, as most clearly seen in FIGS. 2-4, has its upstream edge very close to or in sliding contact with the cylindrical surface of the axle 16A. This provides for substantial isolation of the lean and rich channels 12, 13 downstream of the throttle shutter, for all positions of the throttle shutter (FIGS. 2-4).

In order to continue such isolation into the body of the carburetor, a partition 10 is provided in the mixing passage 22 extending substantially fully between the throttle shutter axle 16A and the throttle shutter axle 17A. The upstream edge of the partition 10 is very close to or in sliding contact with the cylindrical surface of the choke shutter axle 17A. In order to provide the best possible isolation at the throttle shutter 16 the downstream edge of the partition 10 is formed as or carries a sealing member 11 which is in sliding engagement with the surface of the axle 16A. However, a sealing member 11 could be provided at both upstream and downstream edges of the partition 10, as well as at the upstream edge of the dividing wall 15.

The result is that the partition 10 defines an extension of the lean and rich channels 12, 13 upstream of the throttle shutter 16, the partition providing substantial isolation between the lean and rich channels for all rotational positions of the throttle shutter. This isolation is enhanced in this embodiment by the choke shutter 17, which lies flat against the partition 10 when the choke shutter is fully open.

FIG. 2 shows the carburetor 9 at idle operation. The throttle shutter 16 is either fully closed or partially opened and the choke shutter 17, the partition 10 and the dividing wall 15 ensure there is no cross-contamination between the lean channel 12 and rich channel 13.

FIG. 3 shows the carburetor at intermediate operation. The throttle shutter 16 is now in a partial open position. Again the choke shutter 17, the partition 10 and the dividing wall 15 ensure that there is no cross-contamination between the channels 12 and 13 during intermediate operation.

FIG. 4 shows the carburetor at full load operation. The throttle shutter is now in a fully open position. The choke shutter 17, the partition 10 and the dividing wall 15 again ensure that there is no cross-contamination between the channels during full load operation.

Figure 5:
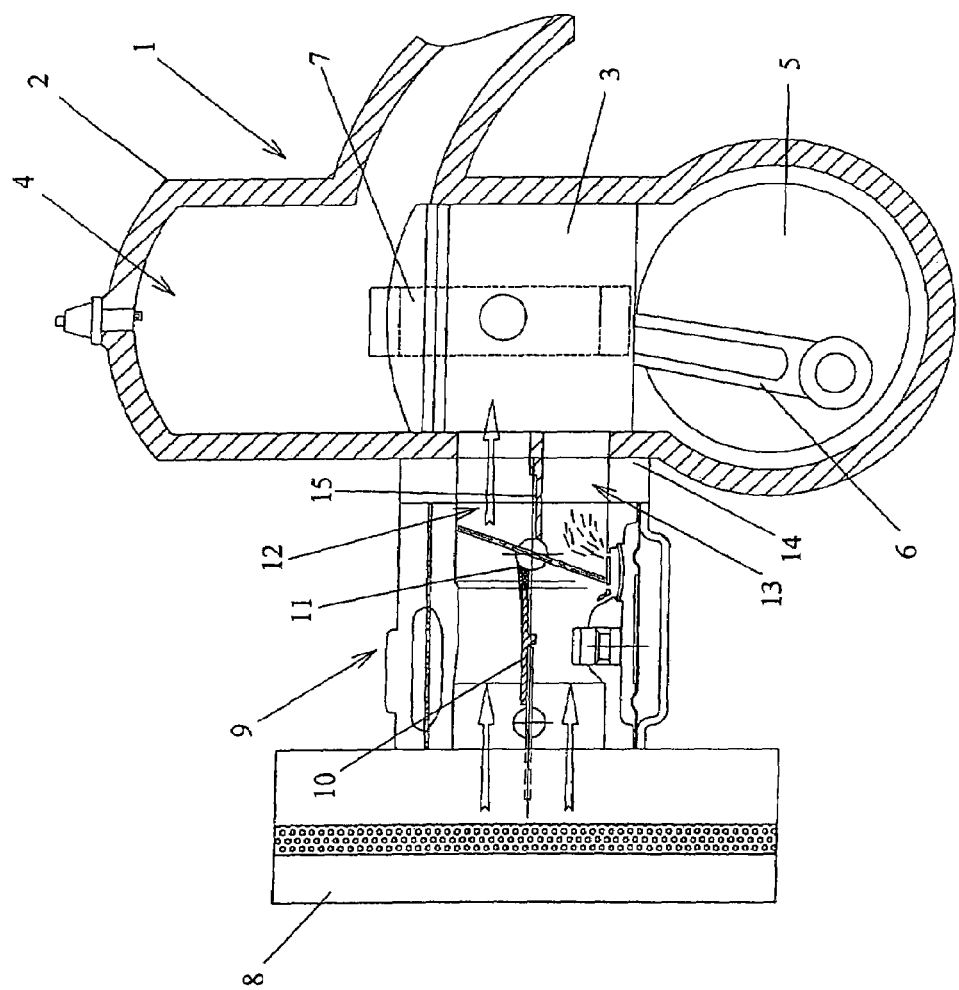
FIG. 5 is a schematic cross-sectional view of a second embodiment of carburetor according to the invention attached to a two-stroke engine.

In a second embodiment of the invention, FIG. 5, the intake duct 14, including the dividing wall 15, forms part of or is assembled to the carburetor body, and both the carburetor and the intake ducting are assembled to the engine. Effectively this makes the dividing wall 15 part of the carburetor.

In both embodiments the carburetor body, partition 10 and sealing member 11 are made by die-casting, moulding or any other suitable manufacturing process from any suitable material such as metal or a rigid fuel-resistant plastics material, and the partition 10 is preferably an integral part of the carburetor body in order to reduce manufacturing costs.

The invention is not limited to the embodiments described herein which may be modified or varied without departing from the scope of the invention.

The invention claimed is:

1. A carburetor for feeding separate lean and rich channels of an engine intake duct, the carburetor comprising a body having a mixing passage with an air intake side and an engine outlet side, a throttle shutter rotatable about an axis transverse the mixing passage, and a partition located within the mixing passage upstream of the throttle shutter, the downstream edge of the partition being adjacent the throttle shutter axis whereby in use of the carburetor the partition defines an extension of the lean and rich channels upstream of the throttle shutter, the partition providing substantial isolation between the lean and rich channels for all rotational positions of the throttle shutter.

2. A carburetor as claimed in claim 1, further including a choke shutter located upstream of the throttle shutter and rotatable about a further axis transverse the mixing passage, the upstream edge of the partition being adjacent to the axis of the choke shutter.

3. A carburetor as claimed in claim 1, wherein the throttle shutter comprises a cylindrical axle, and the downstream edge of the partition is in sliding engagement with the surface of the axle.

4. A carburetor as claimed in claim 1, wherein the carburetor has a wall dividing the lean and rich channels located downstream of the throttle shutter and having its upstream edge adjacent to the axis of the throttle shutter on the opposite side to the downstream edge of the first partition.

5. A method of making a carburetor as claimed in claim 1 wherein the carburetor body and partition are made by die-casting or moulding.

6. A carburetor for feeding separate lean and rich channels of an engine intake duct, the carburetor comprising a body having a mixing passage with an air intake side and an engine outlet side, a throttle shutter rotatable about an axis transverse the mixing passage, and a partition located within the mixing passage upstream of the throttle shutter, the downstream edge of the partition being adjacent the throttle shutter axis whereby in use of the carburetor the partition defines an extension of the lean and rich channels upstream of the throttle shutter, the partition providing substantial isolation between the lean and rich channels for all rotational positions of the throttle shutter;

further including a choke shutter located upstream of the throttle shutter and rotatable about a further axis transverse the mixing passage, the upstream edge of the partition being adjacent to the axis of the choke shutter; and wherein the throttle shutter comprises a cylindrical axle, and the downstream edge of the partition is in sliding engagement with the surface of the axle.

7. A method of making a carburetor as claimed in claim 6 wherein the carburetor body and partition are made by die-casting or moulding.

8. A carburetor for feeding separate lean and rich channels of an engine intake duct, the carburetor comprising a body having a mixing passage with an air intake side and an engine outlet side, a throttle shutter rotatable about an axis transverse the mixing passage, and a partition located within the mixing passage upstream of the throttle shutter, the downstream edge of the partition being adjacent the throttle shutter axis whereby in use of the carburetor the partition defines an extension of the lean and rich channels upstream of the throttle shutter, the partition providing substantial isolation between the lean and rich channels for all rotational positions of the throttle shutter;

further including a choke shutter located upstream of the throttle shutter and rotatable about a further axis transverse the mixing passage, the upstream edge of the partition being adjacent to the axis of the choke shutter; and wherein the carburetor has a wall dividing the lean and rich channels located downstream of the throttle shutter and having its upstream edge adjacent to the axis of the throttle shutter on the opposite side to the downstream edge of the first partition.

9. A method of making a carburetor as claimed in claim 8 wherein the carburetor body and partition are made by die-casting or moulding.

* * * * *